(12) United States Patent
Lin

(10) Patent No.: US 7,408,721 B2
(45) Date of Patent: Aug. 5, 2008

(54) ZOOM LENS

(75) Inventor: Mark Lin, Taichung County (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 0 days.

(21) Appl. No.: 11/705,129

(22) Filed: Feb. 12, 2007

(65) Prior Publication Data

US 2008/0062535 A1    Mar. 13, 2008

(30) Foreign Application Priority Data

Sep. 11, 2006    (TW) .............................. 95216190 U

(51) Int. Cl.
  *G02B 15/14* (2006.01)
  *G02B 15/22* (2006.01)
(52) U.S. Cl. .................. 359/694; 359/704; 359/706
(58) Field of Classification Search .......... 359/694–706
  See application file for complete search history.

(56) References Cited

U.S. PATENT DOCUMENTS 6,072,639 A * 6/2000 Onda ......................... 359/694
6,195,211 B1 * 2/2001 Iwasaki ....................... 359/694
6,522,478 B2 * 2/2003 Nomura et al. ............. 359/694
6,909,844 B2 * 6/2005 Dirisio ........................... 396/6

* cited by examiner

*Primary Examiner*—Mohammed Hasan
(74) *Attorney, Agent, or Firm*—Browdy and Neimark

(57) ABSTRACT

A zoom lens includes a housing, a rotatable adjustment member, a spring member and a lens barrel. The rotatable adjustment member has a ring body rotatably coupled to an inner bottom surface of the housing in such a manner that the ring body is axially moveable relative to the housing when the ring body is rotated. The spring member is a non-planar ring member having two first opposite end portions stopped at an inner top surface of the housing, and two second opposite end portions stopped at a step of the ratable adjustment member. The lens barrel is disposed through an axial hole of the housing and connected to the rotatable adjustment member such that the lens barrel is synchronously movable with the rotatable adjustment member.

5 Claims, 5 Drawing Sheets

ZOOM LENS

BACKGROUND OF THE INVENTION

1. Field of the Invention

The present invention relates generally to a zoom lens for optical equipment such as a camera, a camera-equipped mobile phone and a projector and more particularly, to a zoom lens which is durable in use and easy in manufacturing.

2. Description of the Related Art

To fit the trend of creating electronic products having light, thin, short and small characteristics, parts for electronic products must be small-sized. For example, a zoom lens for mobile phone must be small sized for easy installation in a mobile phone for saving space. A conventional zoom lens for mobile phone generally comprises a housing, a rotatable adjustment member mounted in the housing, and a lens barrel coupled to the rotatable adjustment member. When adjusting the focal length of the zoom lens, the user must rotate the rotatable adjustment member to move the lens barrel forwards or backwards in an axial direction. This design of such zoom lens further comprises a cylindrical spiral coil spring supported between the housing and the rotatable adjustment member to stabilize movement of the rotatable adjustment member, ensuring accurate adjustment of the focal length.

Because the spiral coil spring is made by winding a resilient metal wire into shape, the change between the axial length and volume of the spiral spring before and after compression is not drastic when the rotatable adjustment member is moved to compress or stretch the spiral coil spring. Because of a small compression ratio, the spiral coil spring occupies a big space in the zoom lens, resulting in a barrier to the development of a miniature zoom lens structure. Furthermore, except the requirement for high precision, the parts of a focal length-adjustable lens must be stable and durable. However, when the user rotates the rotatable adjustment member to adjust the focal length of the zoom lens, the end of the spiral coil spring connected to the rotatable adjustment member is synchronously rotated with the rotatable adjustment member, thereby causing stretch and even deformation of the spiral coil spring. When the spiral coil spring is deformed, it is unable to ensure uniform pressure application, thereby resulting in unsmooth operation of the zoom lens and friction of parts. Frequent friction of the parts will shorten the service life of the zoom lens.

SUMMARY OF THE INVENTION

The present invention has been accomplished under the circumstances in view. It is therefore one objective of the present invention to provide a zoom lens, which contains a spring member that won't be stretched by an rotatable adjustment member when the adjustment member is rotated such that it is durable in use.

It is another objective of the present invention to provide a zoom lens, which has a small size, and is easy and inexpensive to manufacture.

To achieve these objectives of the present invention, the zoom lens comprises a housing, a rotatable adjustment member, a spring member, and an lens barrel. The housing has an inner top surface, an inner bottom surface, an inside space defined between the inner top surface and the inner bottom surface, and an axial hole in communication with the inside space. The rotatable adjustment member comprises a ring body rotatably coupled to the inner bottom surface of the housing in such a manner that the ring body is axially moveable in the inside space of the housing when the ring body is rotated. The ring body has a through hole in alignment with the axial hole of the housing, and a step. The spring member is a non-planer ring member having two first opposite end portions and two second opposite end portions respectively stopped at the inner top surface of the housing and the step of the ring body. The lens barrel is inserted through the axial hole of the housing and connected to the rotatable adjustment member such that the lens barrel is synchronously movable with the rotatable adjustment member.

In an embodiment of the present invention, the housing has a traverse side hole in communication with the inside space thereof, through which a protruding block extending from the ring body of the rotatable adjustment member extends to outside of the housing for push by an external force to rotate the rotatable adjustment member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
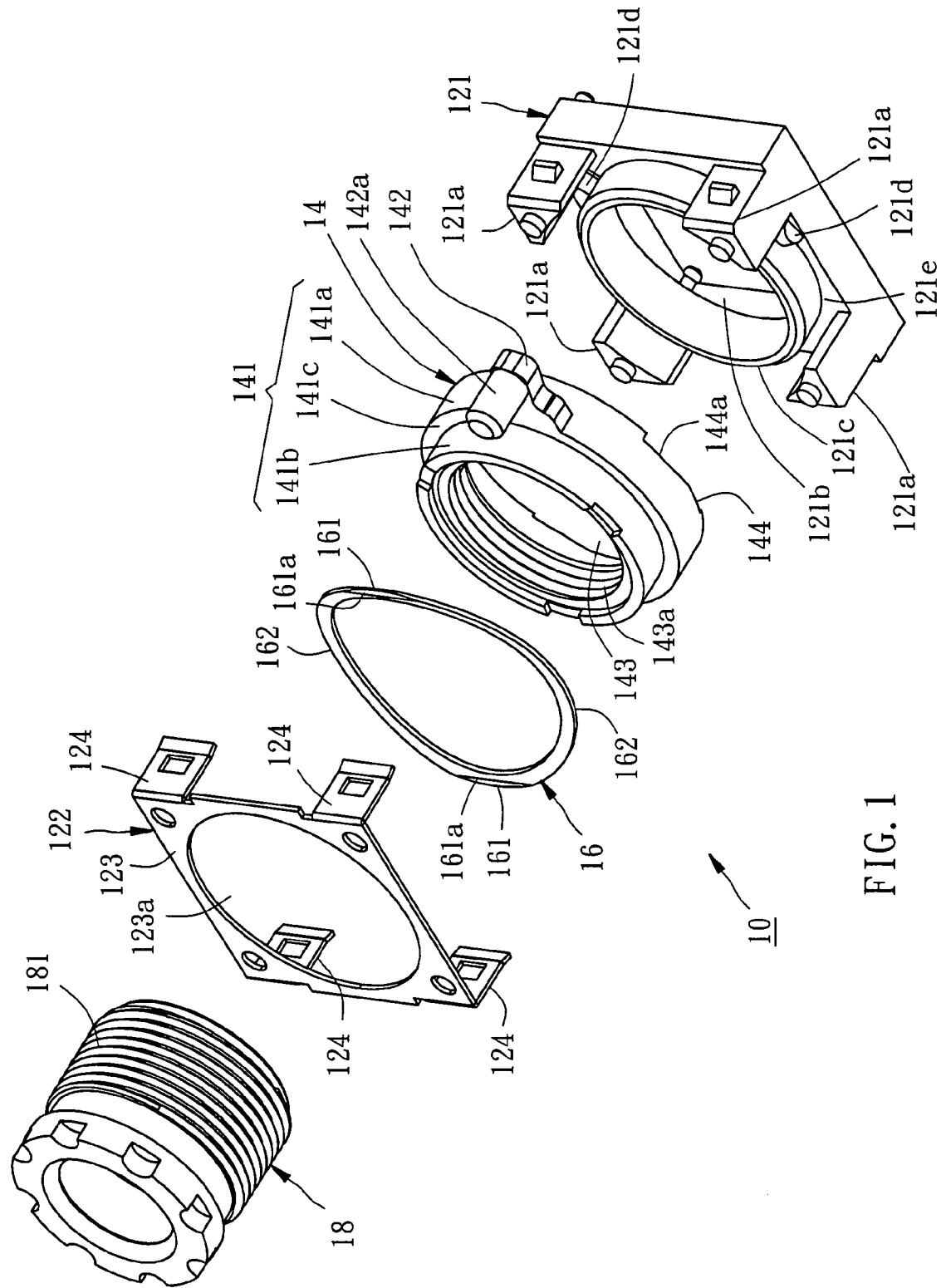
FIG. 1 is an exploded view of a zoom lens according to a preferred embodiment of the present invention.
Figure 2:
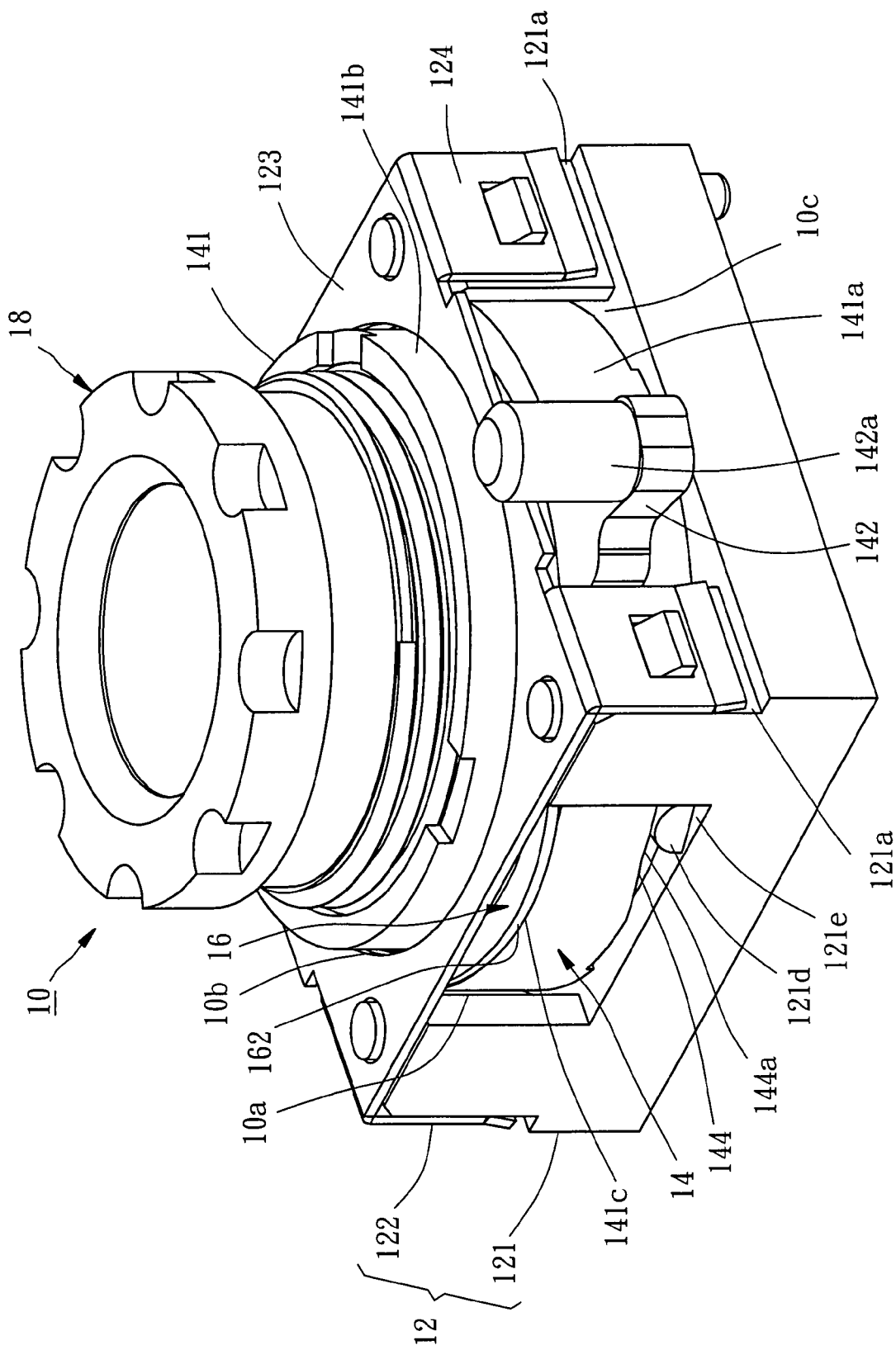
FIG. 2 is a perspective assembly view of the zoom lens according to the preferred embodiment of the present invention.
Figure 3:
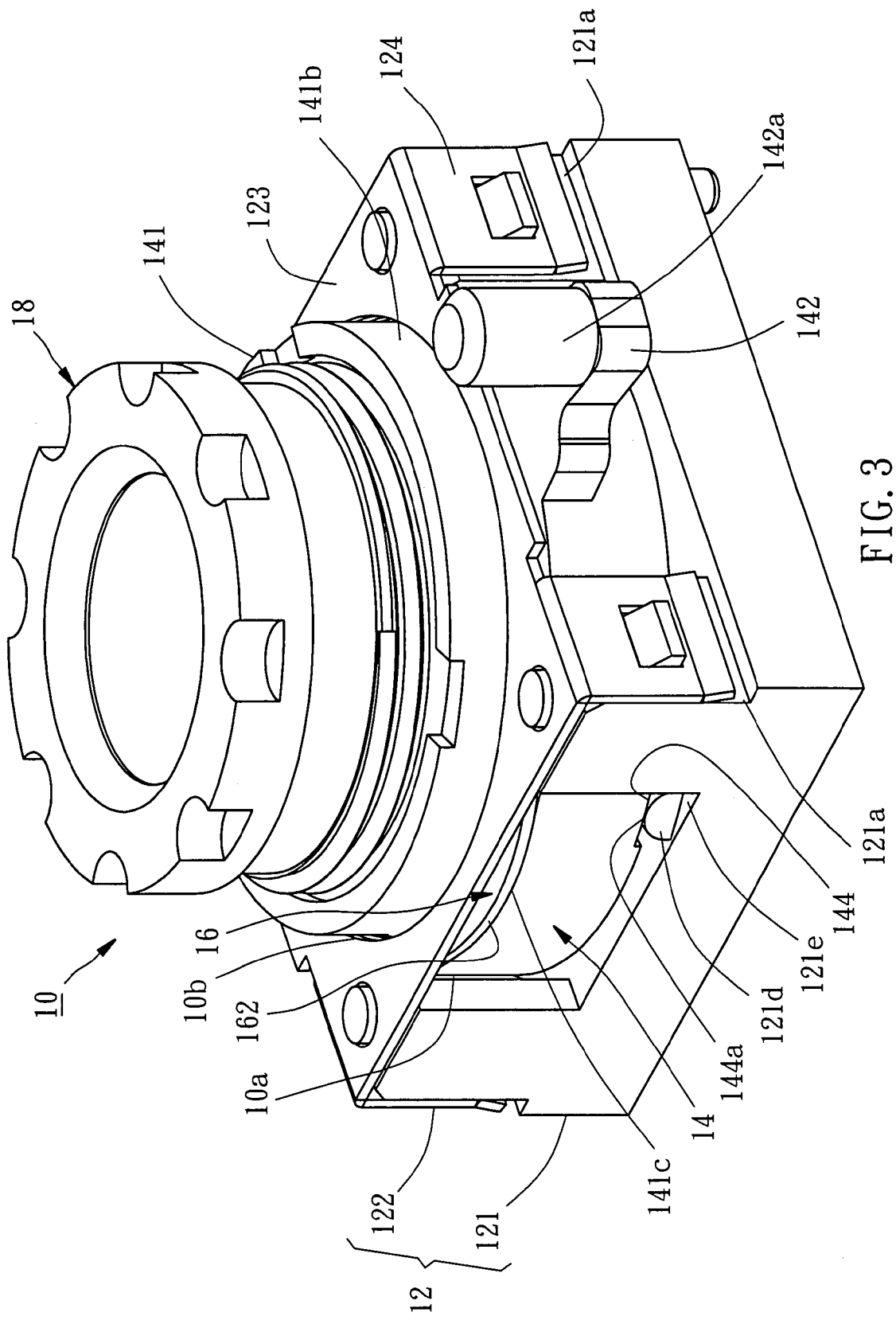
FIG. 3 is similar to FIG. 2, but showing that the rotatable adjustment member is rotated and the lens barrel is moved outwardly.

As shown in FIGS. 1-3, a zoom lens 10 in accordance with a preferred embodiment of the present invention comprises a housing 12, a rotatable adjustment member 14, a spring member 16 and a lens barrel 18.

The housing 12 is comprised of a bottom cover shell 121 and a top cover shell 122. The bottom cover shell 121 is shaped like a rectangular frame, having an upright support 121*a* at each of the four corners extending upwardly from the top surface 121*e* thereof, a circular opening 121*b* at the center, and an annual fringe 121*c* extending upwardly from the top surface 121*e* around the circular opening 121*b*. The annual fringe 121*c* has three arched protrusions 121*d* equiangularly spaced around the outer surface thereof and located on the top surface 121*e* of the bottom cover shell 121. The top cover shell 122 comprises a flat cover panel 123 and four mounting lugs 124 respectively extending from the four corners of the flat cover panel 123. The flat cover panel 123 has a circular opening 123*a*. The four mounting lugs 124 are respectively fastened to the upright supports 121*a* of the bottom cover shell 121 to secure the bottom cover shell 121 and the top cover shell 122 together, thereby defining a space 10*a* between the bottom cover shell 121 and the top cover shell 122. The circular openings 123a of the flat cover panel 123 of the top cover shell 122 and the circular opening 121b of the bottom cover shell 121 are in communication with the space 10a and axially aligned with each other, constituting an axial hole 10b that extends through the housing 12. Further, each two adjacent upright supports 121a define with the flat cover panel 123 of the top cover shell 122 a respective transverse side hole 10c. The axial hole 10b and the side holes 10c communicate the space 10a inside the housing 10 to the space outside the housing 10. After assembly of the bottom cover shell 121 and the top cover shell 122, the bottom surface of the top cover shell 122 is served as an inner top surface of the housing 12 and the top surface 121e of the bottom cover shell 121 is served as an inner bottom surface of the housing 12.

The rotatable adjustment member 14 has a ring body 141 and a protruding block 142 perpendicularly extending from the outer surface of the ring body 141. A rod 142a perpendicularly upwardly extends from the top side of the protruding block 142. The ring body 141 is sleeved onto the annual fringe 121c and located in the space 10a inside the housing 12. The ring body 141 has a through hole 143 axially aligned with the axial hole 10b. The ring body 141 has an inner thread 143a on the inner surface thereof. The outer surface of the ring body 141 has a big diameter section 141a, a small diameter section 141b, and a step 141c connected between the big diameter section 141a and the small diameter section 141b. The ring body 141 further has three bottom notches 144 corresponding in location to the three arched protrusions 121d of the bottom cover shell 121 of the housing 12. Each bottom notch 144 has a beveled face 144a, which slopes from one toward the other end of the respective bottom notch 144. The beveled faces 144a of the bottom notches 144 of the ring body 141 of the rotatable adjustment member 14 are respectively supported on the arched protrusions 121d of the bottom cover shell 121 of the housing 12. When pushing the rod 142a to rotate the ring body 141 relative to the housing 12, as shown in FIG. 3, the beveled faces 144a of the bottom notches 144 of the ring body 141 of the rotatable adjustment member 14 are moved over the respective arched protrusions 121d of the bottom cover shell 121 of the housing 12, and therefore the rotatable adjustment member 14 is moved axially along the axial hole 10b during rotation.

Figure 4:
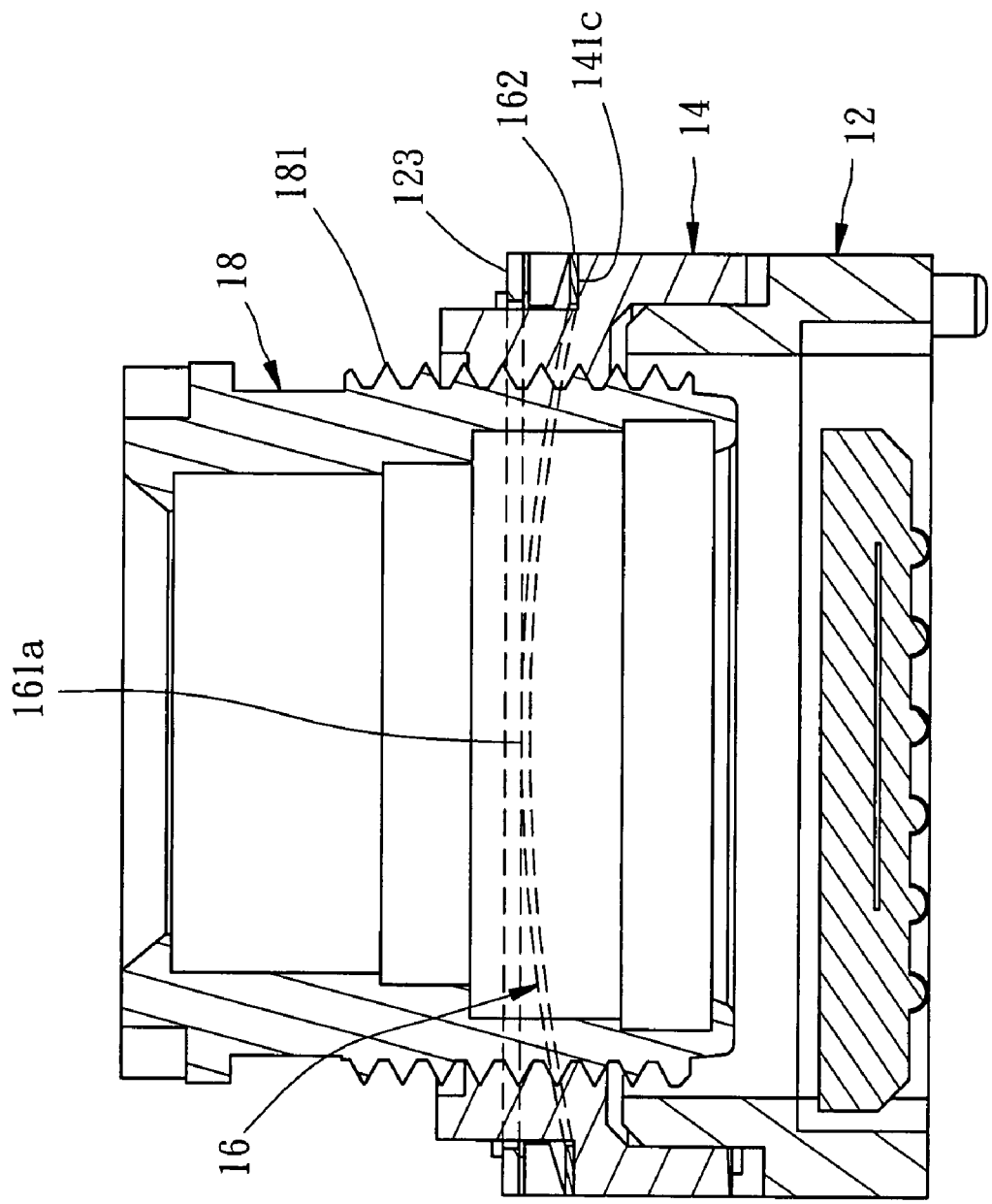
FIG. 4 is a sectional view of FIG. 2, showing the lens barrel in the received position.

The spring member 16 is a ring member made by punching from a metal plate. The spring member 16 has two first end portions 161 at two opposite sides and two second end portions 162 at the other two opposite sides. Each first opposite end portion 161 has a bearing surface 161a. Further, the two first end portions 161 and the two second end portions 162 are located at different elevations, that is, the spring member 16 is a non-planar member. As shown in FIG. 4, the bearing surfaces 161a of the spring member 16 are disposed in close contact with the bottom surface of the flat cover panel 123 of the top cover shell 122, i.e. in contact with the inner top surface of the housing 12, and the two second end portions 162 are supported on the step 141c of the rotatable adjustment member 14. Thus, the spring member 16 imparts a pressure to hold down the rotatable adjustment member 14, keeping the beveled faces 144a of the bottom notches 144 of the ring body 141 of the rotatable adjustment member 14 in positive contact with the respective arched protrusions 121d of the bottom cover shell 121 of the housing 12.

The lens barrel 18 is a cylindrical member holding multiple optical lenses (not shown) therein for image mapping upon an incident light. The lens barrel 18 has an outer thread 181 for engagement with the inner thread 143a in the through hole 143 so that the lens barrel 18 is secured to the rotatable adjustment member 15 and movable with the rotatable adjustment member 15 to adjust the focal length.

The operation of the present invention is outlined hereinafter. FIGS. 2 and 4 show the retracted state of the zoom lens. At this time, the arched protrusions 121d of the housing 12 are respectively stopped at the relatively deeper ends of the beveled faces 144a of the bottom notches 144 of the ring body 141 of the rotatable adjustment member 14 far from the surface 121e of the bottom cover shell 121, and the two second end portions 162 of the spring member 16 impart a pressure to hold the rotatable adjustment member 14 in position, keeping the beveled faces 144a in positive contact with the arched protrusions 121d and preventing displacement of the rotatable adjustment member 14 relative to the housing 12, ensuring positive positioning of the lens barrel 18.

Figure 5:
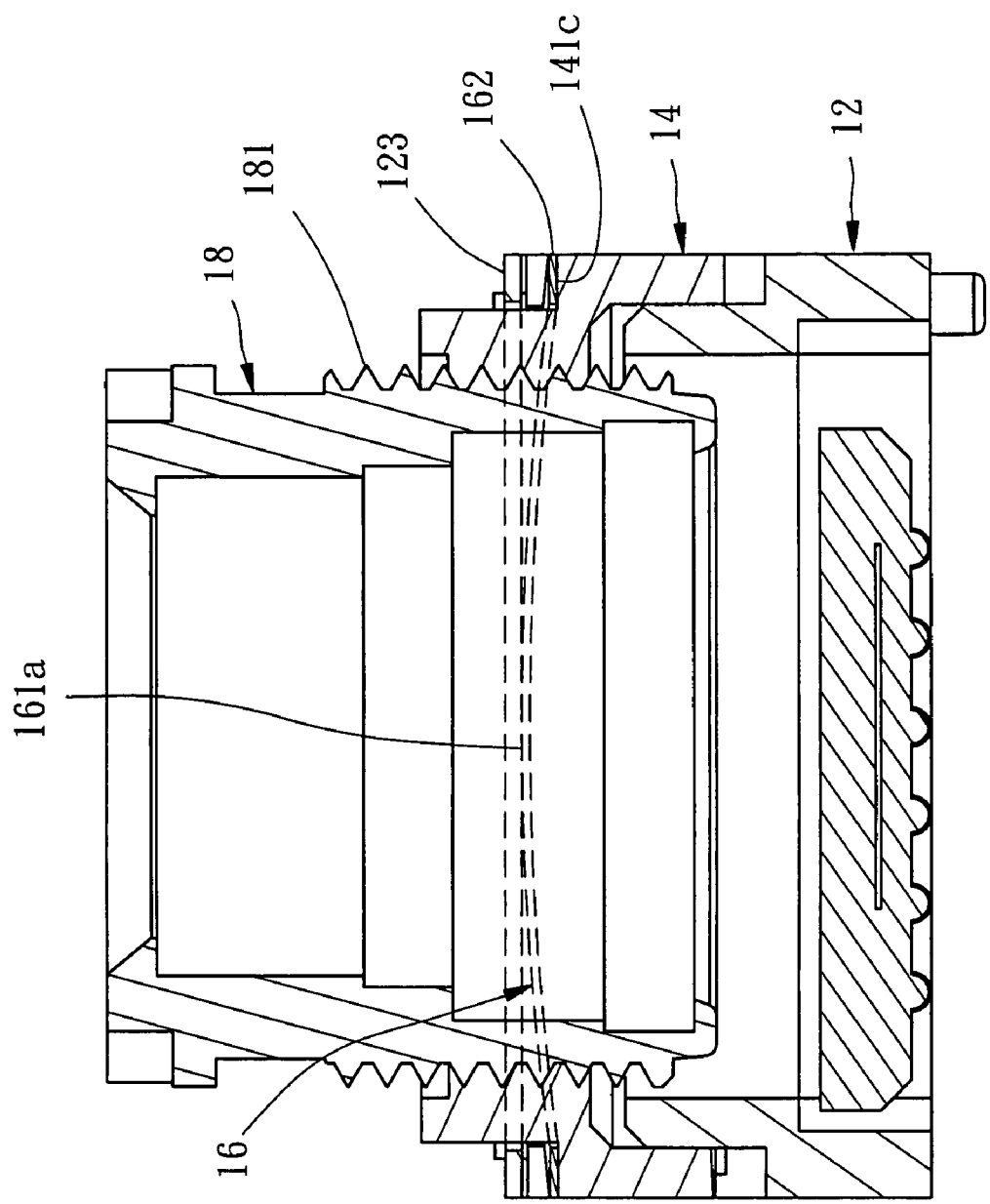
FIG. 5 is a sectional view of FIG. 3, showing the lens barrel in the extended position.

When wishing to extend out the lens barrel 18, as shown in FIGS. 3 and 5, move the rod 142a to rotate the rotatable adjustment member 14, thereby causing movement of the beveled faces 144a of the bottom notches 144 of the ring body 141 of the rotatable adjustment member 14 over the arched protrusions 121d of the housing 12 and rotation of the lens barrel 18 with the rotatable adjustment member 14, and therefore the arched protrusions 121d of the housing 12 are stopped at the relatively shallower ends of the beveled faces 144a of the bottom notches 144 of the ring body 141 of the rotatable adjustment member 14, and at the same time the two second end portions 162 of the spring member 16 impart a pressure to hold down the rotatable adjustment member 14, preventing further slide of the lens barrel 18. As stated above, the spring member 16 is a non-planar ring spring, it does not occupy much installation space (see FIGS. 4 and 5), practical for use in a small-sized product (for example, built-in camera for cellular phone). Further, because the spring member 16 is a ring member, it will not be rotated with the lens barrel 18 or caused to deform during rotary motion of the lens barrel 18. Therefore, the invention eliminates the problem of change of spring force of the spiral spring of the prior art design, i.e., the spring member 16 imparts a constant pressure to the rotatable adjustment member 14 evenly either the lens barrel 18 is rotated forwards or backwards, ensuring smooth operation of the zoom lens 10, reducing friction, and extending the product's service life. Further, because of simple structure, the spring member 16 is easy and inexpensive to make.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A zoom lens comprising:

a housing having an inside space, an inner top surface, an inner bottom surface, and an axial hole in communication with said inside space;

a rotatable adjustment member having a ring body rotatably coupled to the inner bottom surface of said housing in such a manner that said ring body is axially moveable in the inside space of said housing when the ring body is rotated, said ring body having a through hole in alignment with said axial hole of said housing, and a step;

a spring member, which is a non-planar ring member having two first opposite end portions stopped at the inner top surface of said housing, and two second opposite end portions stopped at the step of said ring body of the ratable adjustment member;

a lens barrel disposed through the axial hole of said housing and connected to said rotatable adjustment member such that said lens barrel is synchronously movable with said rotatable adjustment member; and wherein said housing comprises a bottom cover shell and a top cover shell fastened to said bottom cover shell and defining with said bottom cover shell the inside space, said top cover shell and said bottom cover shell each having a circular hole disposed in communication with said inside space, the circular holes of said top cover shell and said bottom cover shell constituting with said inside space the axial hole of said housing, said top cover shell having a bottom surface that forms the inner top surface of said housing, said bottom cover shell having a top surface that forms the inner bottom surface of said housing.

2. The zoom lens as claimed in claim 1, wherein said housing further has a transverse side hole in communication with the inside space thereof, and said rotatable adjustment member further has a protruding block extending from said ring body to outside of said housing through said transverse side hole for push by an external force to rotate said rotatable adjustment member.

3. The zoom lens as claimed in claim 2, wherein said rotatable adjustment member has a rod upwardly extending from said protruding block for push by an external force to rotate said rotatable adjustment member.

4. The zoom lens as claimed in claim 1, wherein said bottom cover shell has an annual fringe upwardly extending from said top surface of said bottom cover shell around the circular hole of said bottom cover shell, a plurality of arched protrusions respectively extending from said annual fringe and located on said top surface of said bottom cover shell; said ring body of said rotatable adjustment member is sleeved onto said annual fringe of said bottom cover shell, and has a plurality of bottom notches corresponding to said arched protrusions, said bottom notches each having a beveled surface sloping inwardly from one end of the respective bottom notch to an opposite end of the respective bottom notch and respectively disposed in contact with said arched protrusions for guiding said rotatable adjustment member to move axially in said axial hole when said rotatable adjustment member is rotated relative to said housing.

5. The zoom lens as claimed in claim 1, wherein the two first opposite end portions of said spring member each have a bearing surface disposed in contact with the inner top surface of said housing.

* * * * *